United States Patent [19]
Bishop et al.

[11] 3,781,748
[45] Dec. 25, 1973

[54] CHALCOGENIDE GLASS BOLOMETER

[75] Inventors: Stephen G. Bishop, Arlington, Va.;
William J. Moore, University Park, Md.

[73] Assignee: The United States of America as represented by the Secretary of the Navy, Washington, D.C.

[22] Filed: May 28, 1971

[21] Appl. No.: 147,931

[52] U.S. Cl. .................. 338/15, 73/355 R, 338/18
[51] Int. Cl. ............................................ H01c 7/08
[58] Field of Search .............. 338/15, 18; 252/500, 252/501; 250/83.3 H, 83 R; 73/355 R, 190 H, 190 R; 106/47

[56] References Cited
UNITED STATES PATENTS

| 3,312,922 | 4/1967 | Eubank et al. | 338/20 |
|---|---|---|---|
| 3,271,591 | 9/1966 | Ovshinsky | 317/234 V |
| 3,103,587 | 9/1963 | Ure, Jr. et al. | 250/83.3 |
| 3,440,588 | 4/1969 | Drake et al. | 338/20 |
| 3,564,353 | 2/1971 | Corak et al. | 338/20 X |
| 2,544,261 | 3/1951 | Gibson | 338/18 |
| 3,420,688 | 1/1969 | Norton | 338/18 X |
| 3,443,103 | 5/1969 | Lakshmanan | 338/15 X |
| 2,884,507 | 4/1959 | Czipott et al. | 338/15 |
| 2,995,660 | 8/1961 | Lempicki | 338/18 X |
| 2,866,878 | 12/1958 | Briggs et al. | 338/15 X |

Primary Examiner—C. L. Albritton
Attorney—R. S. Sciascia, Arthur L. Branning, Philip Schneider and Sol Sheinbein

[57] ABSTRACT

A chalcogenide glass bolometer for detection of electromagnetic radiation at wavelengths varying from infrared to microwave. The radiation absorbed by the glass increases its electrical conductivity, enabling measurement of the radiation. A method of fabricating the bolometer is also disclosed.

6 Claims, 1 Drawing Figure

3,781,748
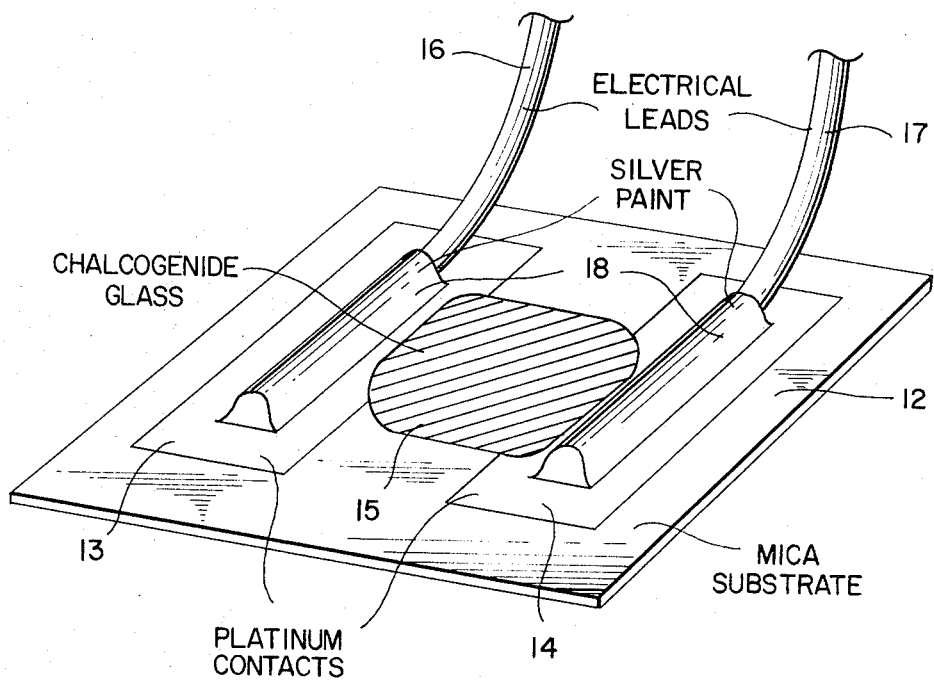
INVENTORS
STEPHEN G. BISHOP
WILLIAM J. MOORE
ATTORNEYS

CHALCOGENIDE GLASS BOLOMETER

BACKGROUND OF THE INVENTION

There exist many devices for the detection of light in various ranges of the spectrum: photomultipliers in the ultraviolet, visible, and near infrared, intrinsic photoconductors and photovoltaic detectors in the infrared, extrinsic photoconductors in the far infrared, etc. Each of these devices provides excellent detectivity in its particular spectral range, but their response is limited to this specific segment of the spectrum. Devices which detect radiation over broad spectral ranges (i.e., visible to very far infrared) include the Golay cell, the thermocouple detector, pyroelectric detectors and bolometers. Each of these devices contains a detector element which is heated by the radiation to be detected. In the case of the Golay cell, a gas filled bag expands when heated by the incident radiation. This device is expensive to construct, is very delicate, and extremely susceptible to mechanical damage. The thermocouple detector is also somewhat difficult to construct, requiring a very fine thermocouple junction in an evacuated housing. The vacuum tight housing must incorporate a window which is bound to absorb some of the incident radiation. The thermocouple's low electrical impedance necessitates transformer coupling to the amplifier. Pyroelectric detectors are constructed from crystals whose growth must be carefully controlled.

The method of operation of a bolometer may be described as follows. The incident radiant power is absorbed and thus raises the temperature, changing the electrical resistance, which change of resistance is converted into a change of potential by means of a battery and load resistor, connected in series across the bolometer.

Bolometers have been constructed from many materials and their operation amounts simply to a change in their electrical resistance when heated by absorbed radiation. The most sensitive bolometers such as indium antimonide, impurity doped germanium, free electron gas bolometers, and the carbon bolometer must be cooled to 4°K or less. These too require specialized technology for their construction.

SUMMARY OF THE INVENTION

The present invention overcomes the difficulties previously found in radiation detectors. It comprises a chalcogenide glass bolometer whose semiconducting glass conductivity increases when radiation strikes it. The generated signal is then analyzed to measure the radiant heat.

OBJECTS OF THE INVENTION

It is therefore an object of the present invention to provide an improved radiation detector capable of detecting electromagnetic radiation ranging from the visible through the infrared to the microwave.

Another object of the present invention is to provide a bolometer operable at room temperature and at atmospheric pressure.

Yet another object of the present invention is to provide a bolometer that is simple and inexpensive to produce.

These and other objects, advantages and novel features of the invention will be apparent from the following description and the accompanying drawing, wherein:

The FIGURE is a perspective view of the bolometer embodying the present invention.

DESCRIPTION OF THE PREFERRED EMBODIMENT

Referring to the FIGURE, there is shown a bolometer 11 constructed according to the teachings of the present invention. A thin mica substrate 12 forms the base of the bolometer. Two thin film platinum electrical contacts 13, 14, baked onto the mica substrate 12 are spaced about 5 mm apart. A very thin film, approximately 30 $\mu$ thick, of chalcogenide glass $Tl_2 S\, eAs_2 Te_3$ 15, pressed onto the mica substrate 12 overlaps the two platinum contacts 13, 14 provides an electrical conduction path between the contacts. The electrical conductivity of the chalcogenide glass detector element is a strong function of temperature. When radiation is absorbed by the semiconducting glass, the resultant heating causes a detectable increase in the electrical conductivity. Portions of the platinum contacts 13, 14 are left exposed and lengths of leads 16, 17 are then attached to the exposed portions of the contacts with conducting silver paste 18. The low thermal conductivity of the mica substrate 12 and the electrical leads (manganin or constantan) 16, 17 serves to thermally isolate the glass detector element 15. The device is then painted with flat black paint to improve its absorption characteristics since the semiconducting glass itself is about 35% reflecting. The completed device is then mounted in an aluminum minibox housing for electrical shielding. Under typical operating conditions the chalcogenide detector 15, having a resistance on the order of 250,000 ohms is connected in series with a 500,000 ohm load resistor and a 50 microampere current is passed through the circuit. Radiation from a 500°K black body source is mechanically chopped at a frequency of 15 Hz and is incident upon the detector. The resulting 15 Hz ac voltage generated across the detector element is amplified and monitored by a wave analyzer or lock-in amplifier which is synchronized with the chopping rate of the source.

The new chalcogenide glass, used in the construction of the bolometer comprises the new feature of the invention. The chalcogenide glass bolometer detects radiation ranging from the visible to the far infrared (sub millimeter microwave) and operates at room temperature and at atmospheric pressure. It provides moderately good detectivity, rivaling that of the far more complicated room temperature devices, over a broad range of wavelengths under the simplest possible operating conditions, with electrical impedance (100k ohm) that matches well to the input impedance of typical preamplifiers. The physical characteristics of the chalcogenide material make it highly suitable as a bolometer element and extremely simple to produce and fashion into a device. The electrical and thermal characteristics of glassy chalcogenide alloys such as $Tl_2SeAs_2Te_3$ are not at all sensitive to the presence of trace amounts of impurity atoms as are crystalline semiconductors. Hence one need not take expensive precautions in production to maintain high purity. In addition, the low softening temperature of the glass (100°C) makes it possible to produce thin films through the hot pressing technique, rather than by tedious grinding and polishing.

Thus, in the present invention, the chalcogenide glass alloy constitutes a new room temperature bolometer material, which offers simple and inexpensive production, and great ease and versatility for device formation, since as a glassy or amorphous semiconductor material, it can be formed by hot pressing or evaporation without concern about loss of crystalline order (structure) or purity.

There is a large range of alloy compositions in the system Tl-Se-As-Te from which bolometers could be constructed having various sensitivities (detectivities). The Cd-Ge-As, Cd-Ge-P, As-Te-Se systems, and systems based on Ge-Te, and containing varying amounts of As, Si, and Ge also contain some alloy compositions which are suitable for bolometers. In general, any system of amorphous or glassy alloys based on the chalcogens S, Se, and Te may contain suitable compositions. It is only necessary to select the proper electrical conductivity, optical absorption, and low softening temperature to achieve the best performance and formability. Many alternative geometric configurations can be conceived for the device construction. Different electrical contact materials, substrate materials, detector housings, or integrating cavities might be chosen to improve device performance. In some cases, cooling the device below room temperature might improve its performance. The chalcogenide glass may also be vapor deposited or flame sputtered onto the mica substrate.

While specific embodiments of the invention have been described in detail to illustrate the application of the principles thereof, it will be apparent to those skilled in the art that the invention may be otherwise embodied without departing from such principles. It is therefore to be understood, that within the scope of the appended claims, the invention may be practiced otherwise than as specifically described.

What is claimed and desired to be secured by Letters Patent of the United States is:

1. A bolometer comprising:
   a thin substrate fabricated from a material of low thermal conductivity;
   a pair of electrical contacts on said substrate; and
   an electromagnetic radiation detector comprising a thin film of chalcogenide glass in contact with both said electrical contacts and said substrate,
   the electronical conductivity of said glass changing in accordance with the heating effect thereon of impinging electromagnetic radiation.

2. A bolometer as recited in claim 1 wherein said detector comprises an alloy system based on the chalcogens S, Se, and Te.

3. A bolometer as recited in claim 1 wherein said chalcogenide glass is selected from systems consisting of Cd-Ge-As, Cd-Ge-P and As-Te-Se.

4. A bolometer as recited in claim 3 wherein:
   said substrate comprises mica;
   said electrical contacts comprise platinum; and
   the chemical composition of said chalcogenide detector is $Tl_2SeAs_2Te_3$.

5. A bolometer as recited in claim 4 wherein:
   said electrical contacts are baked onto said substrate; and
   said detector is pressed onto said substrate.

6. A bolometer as in claim 1, wherein said chalcogenide glass is selected from systems based on Ge-Te and containing at least one more elements from the group consisting of As, Si and Ge.

* * * * *